(12) United States Patent
Kim et al.

(10) Patent No.: US 12,518,373 B2
(45) Date of Patent: Jan. 6, 2026

(54) METHODS OF CLASSIFYING DEFECTS OF A PATTERN

(71) Applicant: Samsung Electronics Co., Ltd., Suwon-si (KR)

(72) Inventors: Kihyun Kim, Seongnam-si (KR); Donyun Kim, Seoul (KR); Nohong Kwak, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 469 days.

(21) Appl. No.: 18/150,936

(22) Filed: Jan. 6, 2023

(65) Prior Publication Data

US 2023/0281794 A1    Sep. 7, 2023

(30) Foreign Application Priority Data

Mar. 4, 2022    (KR) .................. 10-2022-0027842

(51) Int. Cl.
*G06T 7/90*    (2017.01)
*G06T 7/00*    (2017.01)

(52) U.S. Cl.
CPC ............ *G06T 7/001* (2013.01); *G06T 7/0006* (2013.01); *G06T 7/90* (2017.01);
(Continued)

(58) Field of Classification Search
CPC ......... G06T 7/001; G06T 7/0006; G06T 7/90; G06T 2207/10024; G06T 2207/10061;
(Continued)

(56) References Cited

U.S. PATENT DOCUMENTS 8,581,976 B2    11/2013  Kurihara et al.
8,837,809 B2     9/2014  Jeong
(Continued)

FOREIGN PATENT DOCUMENTS

JP            5857675 B2    2/2016
KR    10-2010-0068734 A    6/2010

OTHER PUBLICATIONS

Lee, Y., & Lee, J. (2014). Accurate automatic defect detection method using quadtree decomposition on SEM images. IEEE Transactions on semiconductor manufacturing, 27(2), 223-231. (Year: 2014).*

(Continued)

*Primary Examiner* — Gregory A Morse
*Assistant Examiner* — Renae A Bitor
(74) *Attorney, Agent, or Firm* — Fish & Richardson P.C.

(57) ABSTRACT

In a method of classifying defects of a pattern, SEM images having different colors on the same pattern are aligned and merged. The defects of the pattern are located by color difference in the merged SEM image. The defects of the pattern are firstly located at the location of the defects. A design in which a layout of the pattern is drawn, and the merged SEM image are aligned. The defects of the pattern are secondly classified by comparing the layout of the pattern drawn in the design and the merged SEM image. A type of the defects of the pattern is determined by combination of the first and second classifications of the defects of the pattern.

20 Claims, 8 Drawing Sheets

(52) U.S. Cl.
CPC ............... *G06T 2207/10024* (2013.01); *G06T 2207/10061* (2013.01); *G06T 2207/20221* (2013.01); *G06T 2207/30148* (2013.01)

(58) Field of Classification Search
CPC . G06T 2207/20221; G06T 2207/30148; G06T 7/0004; G06T 7/30; G01N 23/2251; G01N 23/04; G01N 23/18; G01N 2223/079; G01N 2223/401; G01N 2223/6116; G01N 2223/646
See application file for complete search history.

(56) References Cited

U.S. PATENT DOCUMENTS

| | | | |
|---|---|---|---|
| 9,811,897 B2 | 11/2017 | Harada et al. | |
| 2003/0012422 A1 | 1/2003 | Sawai et al. | |
| 2013/0070078 A1* | 3/2013 | Takagi | G06T 7/001 348/80 |
| 2016/0180513 A1* | 6/2016 | Park | G06F 18/22 382/149 |
| 2019/0025773 A1 | 1/2019 | Yang et al. | |
| 2019/0287015 A1 | 9/2019 | Plihal | |
| 2020/0034693 A1 | 1/2020 | Huh et al. | |
| 2021/0209410 A1 | 7/2021 | Pan | |
| 2021/0364450 A1 | 11/2021 | Lauber et al. | |

OTHER PUBLICATIONS

Chang, C. Y., Li, C., Chang, J. W., & Jeng, M. (2009). An unsupervised neural network approach for automatic semiconductor wafer defect inspection. Expert systems with Applications, 36(1), 950-958. (Year: 2009).*

Chou, P. B., Rao, A. R., Sturzenbecker, M. C., Wu, F. Y., & Brecher, V. H. (1997). Automatic defect classification for semiconductor manufacturing. Machine vision and applications, 9, 201-214. (Year: 1997).*

Nishu, S. A. (2012). Quantifying the defect visibility in digital images by proper color space selection. International journal of engineering research and applications, 2(3), 1764-1767. (Year: 2012).*

\* cited by examiner

METHODS OF CLASSIFYING DEFECTS OF A PATTERN

CROSS-REFERENCE TO RELATED APPLICATION

This application claims priority under 35 U.S.C. § 119 to Korean Patent Application No. 10-2022-0027842 filed on Mar. 4, 2022 in the Korean Intellectual Property Office, the disclosure of which is hereby incorporated by reference in its entirety.

TECHNICAL FIELD

Example embodiments of the present disclosure relate to a method of classifying defects of a pattern. More particularly, example embodiments of the present disclosure relate to a method of classifying defects of a semiconductor pattern.

DISCUSSION OF RELATED ART

Conventionally, pattern defects are analyzed using a die-to-die SEM equipment, and the analyzation is performed manually, which needs much time. Thus, machine learning method has been recently developed. However, various shapes of pattern defects have to be learned in advance in the machine learning method, and thus much time also is required and learning various shapes of pattern defects is not easy.

SUMMARY

Example embodiments provide an enhanced method of classifying defects of a pattern.

According to example embodiments of the inventive concepts, there is provided a method of classifying defects of a pattern. In the method, SEM images having different colors on the same pattern may be aligned and merged. The defects of the pattern may be located by color difference in the merged SEM image. The defects of the pattern may be firstly located at the location of the defects. A design in which a layout of the pattern is drawn, and the merged SEM image may be aligned. The defects of the pattern may be secondly classified by comparing the layout of the pattern drawn in the design and the merged SEM image. A type of the defects of the pattern may be determined by combination of the first and second classifications of the defects of the pattern.

According to example embodiments of the inventive concepts, there is provided a method of classifying defects of a pattern. In the method, SEM images having different colors on the same pattern may be aligned and merged. The defects of the pattern may be located by color difference in the merged SEM image. The defects of the pattern at the location of the defects may be classified. The pattern may be corrected based on the classification of the defects.

According to example embodiments of the inventive concepts, there is provided a method of classifying defects of a pattern. In the method, SEM images having different colors on the same pattern may be aligned and merged. The defects of the pattern may be located at a portion of the merged SEM image represented by a color that is one of colors of the first and second SEM images except for black (b). The defects of the pattern may be firstly classified at the location of the defects by the represented color in the merged SEM image as to whether a newly portion is generated or a portion is lost in the pattern. A design in which a layout of the pattern is drawn, and the merged SEM image may be aligned. The defects of the pattern may be secondly classified by comparing the layout of the pattern drawn in the design and the merged SEM image. A type of the defects of the pattern may be determined by combination of the first and second classifications of the defects of the pattern.

In the method of classifying the defects of the pattern, the locations and generation and/or extinction of a portion of the pattern may be confirmed by detecting the color difference in the merged SEM image, and the shape of the portion of the pattern in which the defects are generated may be confirmed by comparing the design of the pattern and the merged SEM image. Accordingly, the classification of the defects of the pattern may be easily, precisely, and automatically performed.

DETAILED DESCRIPTION

The above and other aspects and features of the inventive concepts will become readily understood from detail descriptions that follow, with reference to the accompanying drawings. It will be understood that, although the terms "first," "second," and/or "third" may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second or third element, component, region, layer, or section without departing from the teachings of inventive concepts.

Figure 1:
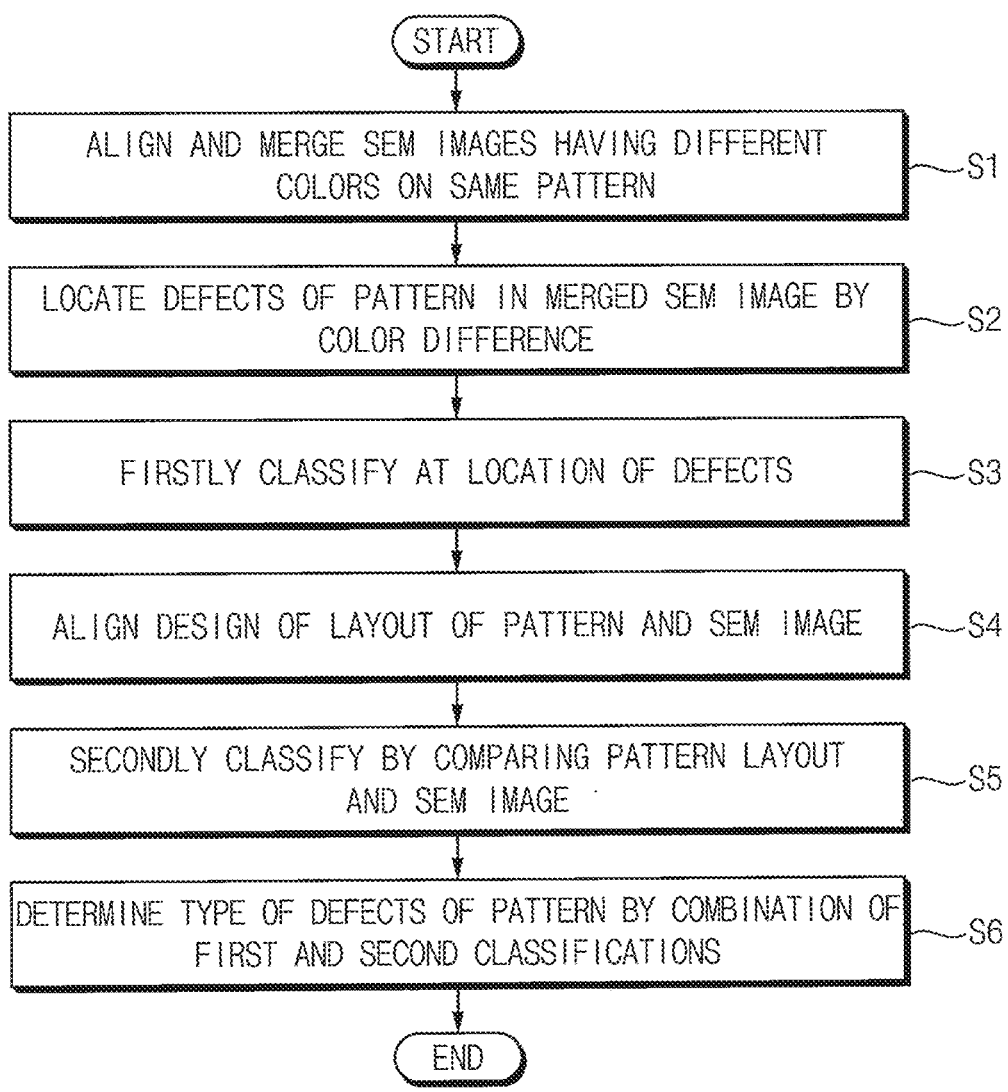
FIG. 1 is a flowchart illustrating a method of classifying defects of a pattern in accordance with example embodiments.
Figure 2:
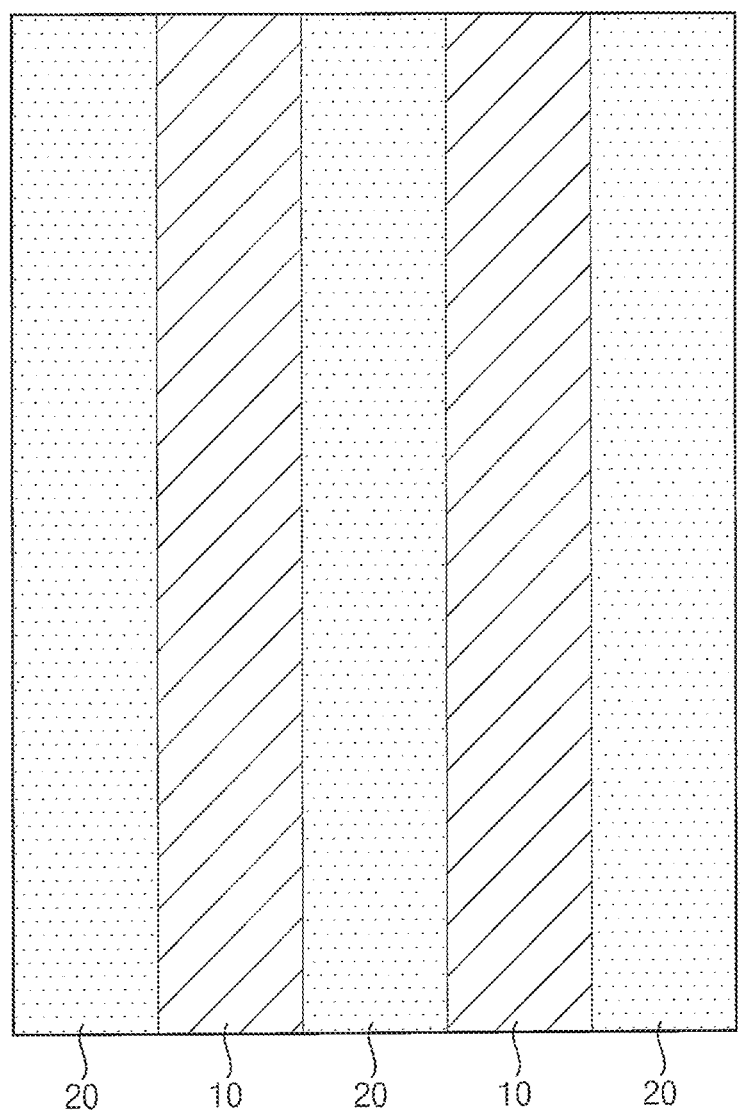
FIGS. 2 to 6 are drawings illustrating the method of classifying the defects of the pattern.
Figure 3:
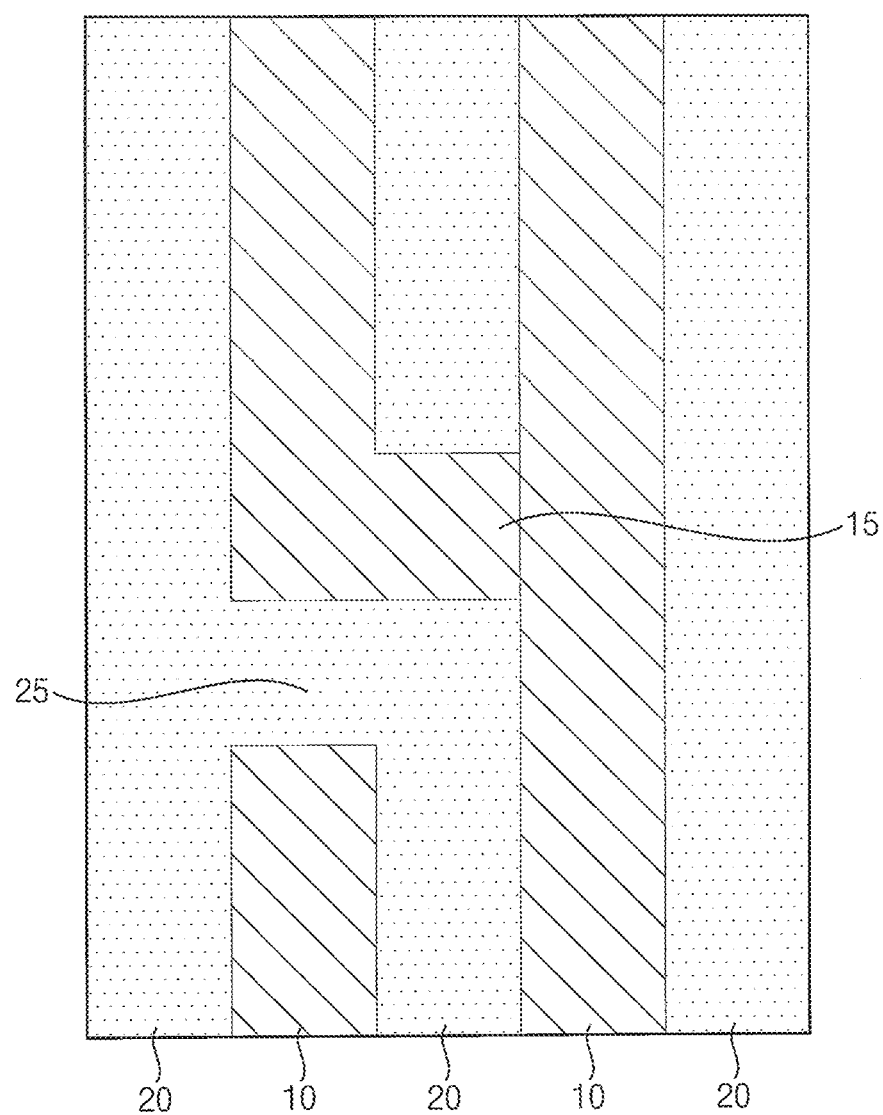
Figure 4:
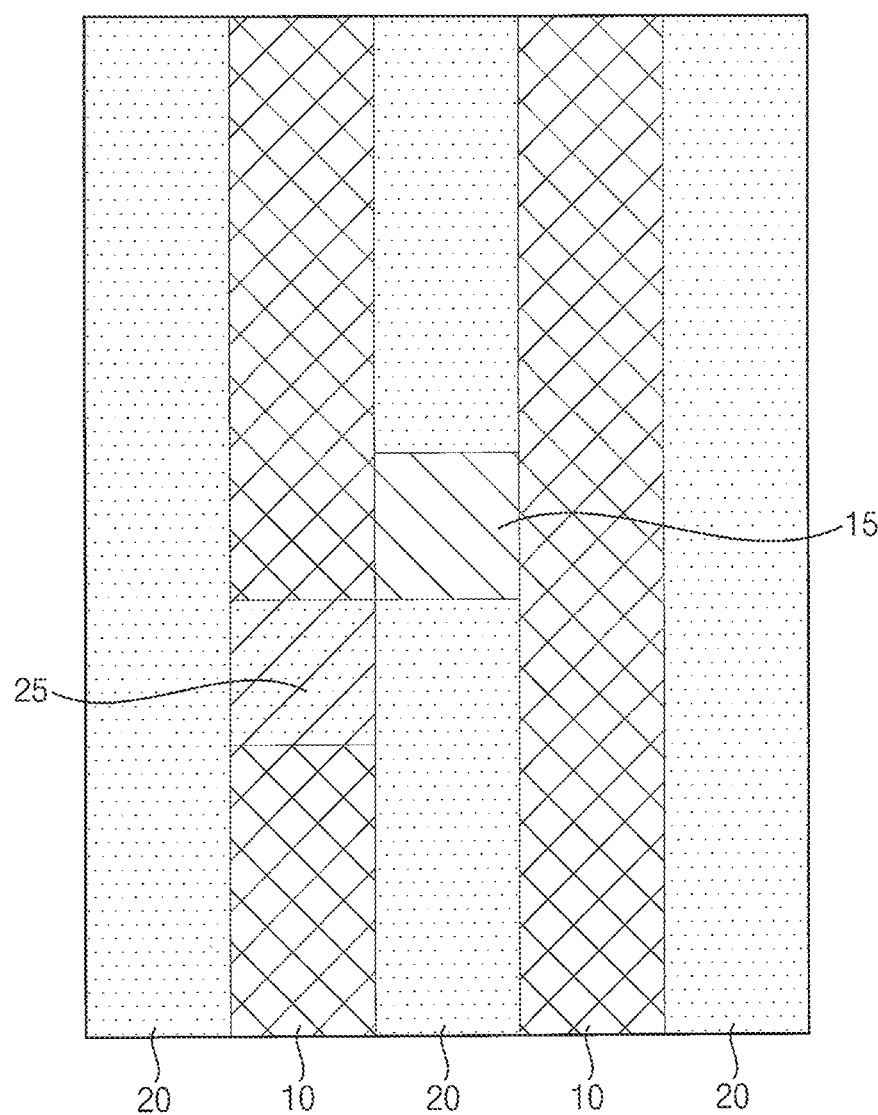
Figure 5:
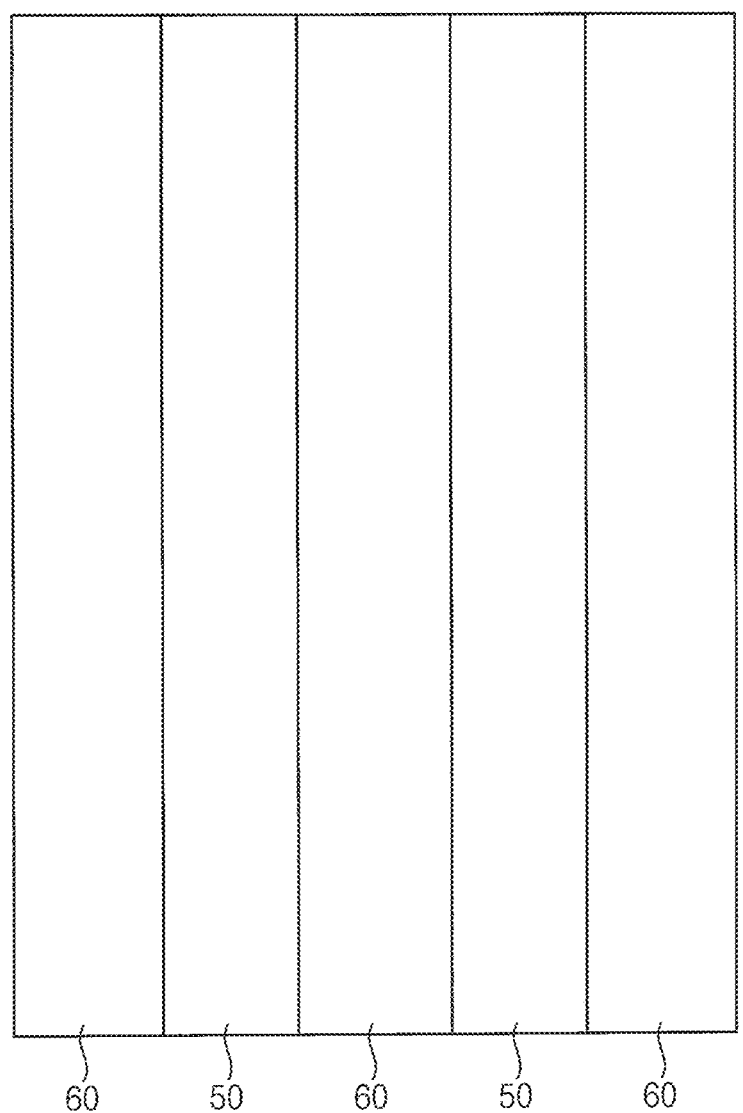
Figure 6:
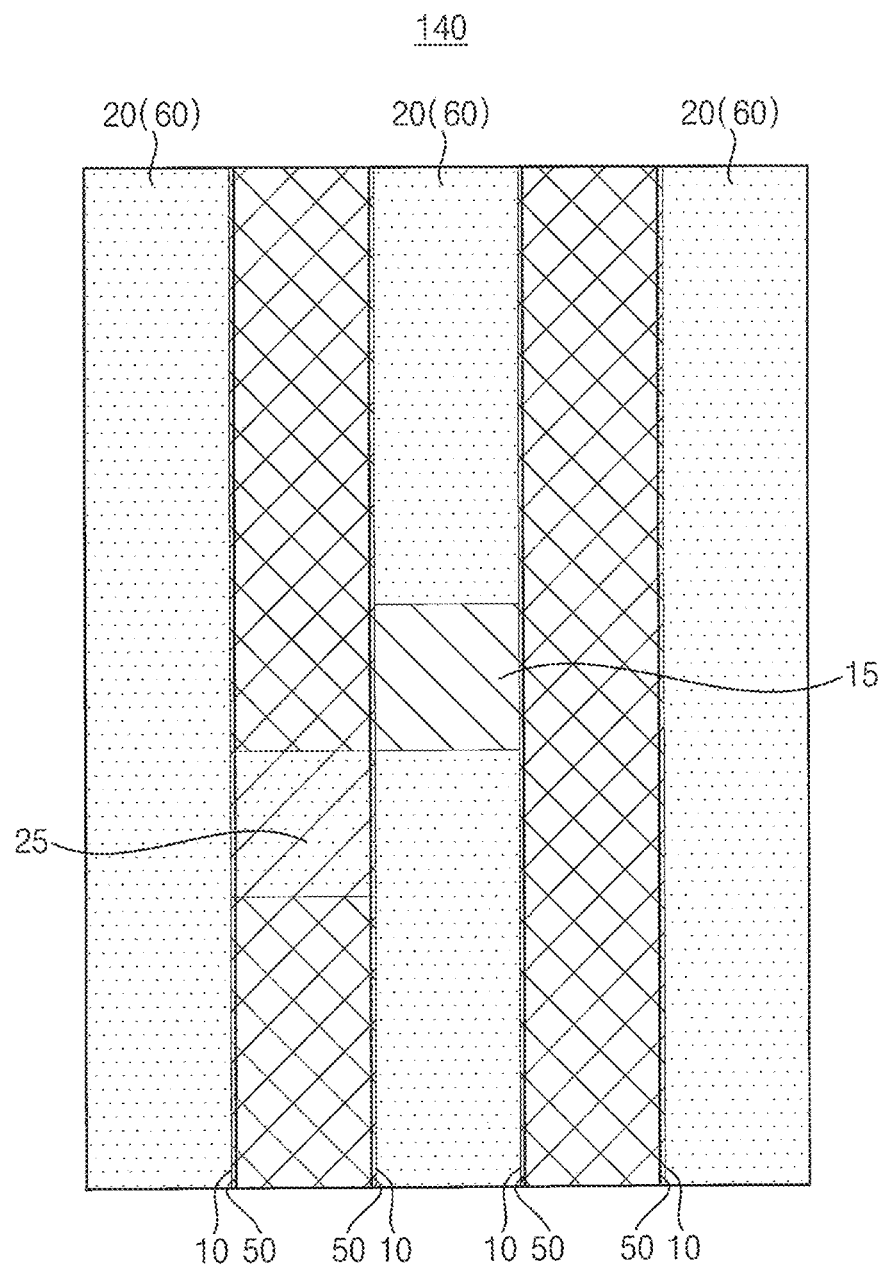

FIG. 1 is a flowchart illustrating a method of classifying defects of a pattern in accordance with example embodiments, and FIGS. 2 to 6 are drawings illustrating the method of classifying the defects of the pattern. FIGS. 2 to 4 are drawings about scanning electron microscope (SEM) of the pattern, FIG. 5 is a design of a layout of the pattern, and FIG. 6 is a drawing in which FIGS. 4 and 5 are aligned.

Referring to FIG. 1, in step S1, SEM images of the same pattern, which have different colors from each other, may be aligned and merged.

FIG. 2 is a plan view of a SEM image in a given region of a reference chip (or a reference die) having a pattern, e.g., a semiconductor pattern, and FIG. 3 is a plan view of a SEM image in a region of a target chip (or a target die) having the pattern, which may correspond to the given region of the reference chip or the reference die.

Hereinafter, the SEM image of the reference chip shown in FIG. 2 may be referred to as a first SEM image 100, and the SEM image of the target chip shown in FIG. 3 may be referred to as a second SEM image 110.

In example embodiments, the first and second SEM images 100 and 110 may have different colors. For example, each of the first and second SEM images 100 and 110 may have one of red (R), green (G) and blue (B). Hereinafter, for the convenience of explanation, only the case in which the first and second SEM images 100 and 110 have red (R) and green (G), respectively, is explained, however, the example embodiments are not limited thereto.

FIGS. 2 and 3 show an example pattern that has lines and spaces, however, the example embodiments are not limited thereto, and the pattern may have other various shapes.

The first SEM image 100 is an image of a pattern in the reference chip or a chip manufactured, e.g., under best conditions, and may include first lines 10 and first spaces 20. For example, the first SEM image 100 may be an image of a reference without defects. In some example embodiments, the first SEM image 100 may be an image, taken by using a scanning electron microscope (SEM). In these cases, a semiconductor element may include any one of a plurality of chips included on a wafer. An SEM image may have various sizes according to field of view (FOV) of the SEM. For example, the SEM image may be and/or include an image, taken by using a scanning electron microscope (SEM), of a portion of a chip corresponding to a semiconductor element including, e.g., a plurality of first lines 10. Each of the first lines 10 may extend in a first direction D1, and the first lines 10 may be spaced apart from each other in a second direction D2. The second direction D2 may be, for example, substantially perpendicular to the first direction D1. The first spaces 20 may be disposed between ones of the first lines 10 neighboring in the second direction D2. Each of the first lines 10 may be represented by red (R), and each of the first spaces 20 may be represented by black (b).

The second SEM image 110 is an image of a pattern in the target chip or a chip manufactured under off conditions. The second SEM image 110 may include the first lines 10 and the first spaces 20 as the first SEM image 100. Each of the first lines 10 may be represented by green (G), and each of the first spaces 20 may be represented by black (b). Unlike the first SEM image 100, the second SEM image 110 may include defects of the pattern.

For example, unlike the first SEM image 100, the second SEM image 110 may further include a protrusion portion 15 protruding from a first one of the first lines 10 in the second direction D2 to contact a second one of the first lines 10 adjacent to the first one thereof. The protrusion portion 15 may be represented by green (G).

Additionally, the first one of the first lines 10 may be partially broken so as to be divided into two parts in the first direction D1. The broken part of the first one of the first lines 10 may be referred to as a cut portion 25, which may be represented by black (b) as the first spaces 20. However, the example embodiments are not limited thereto.

For example, the pattern in the second SEM image 110 may include a pinch defect in which a pattern is thinning and/or broken and/or a bridge defect in which a pattern is thickened and/or adjacent patterns are attached to each other. For example, the pinch defect may include a thinning defect, in which a corresponding portion of a pattern is thinned, and the bridge defect may include a fattening defect, in which a corresponding portion of a pattern is thickened. However, the examples are not limited thereto.

FIG. 4 is a drawing in which FIGS. 2 and 3 are aligned and merged with each other.

Referring to FIG. 4, as the first and second SEM images 100 and 110 having the different colors from each other are aligned and merged with each other, a merged SEM image 120 having different colors from the colors of the first and second SEM images 100 and 110, that is, mixed colors of the colors of the first and second SEM images 100 and 110 may be generated.

Referring to FIG. 1, in step S2, defects of the pattern may be located by colors in the merged SEM image 120 (hereinafter, also referred to as a third SEM image 120).

Particularly, the third SEM image 120 may include the first lines 10, each of which may extend in the first direction D1, spaced apart from each other in the second direction D2, and the first spaces 20 between ones of the first lines 10 neighboring in the second direction D2. In general, according to a color mixing theory (e.g., an additive color theory such as the Red Green Blue (RGB) color model) and/or a color mixing phenomenon, when a red color (and/or light) is mixed with a green color (and/or light), a yellow color (and/or light) may be generated. Accordingly, when a pattern portion of red color is combined with a pattern portion of green color, a corresponding pattern portion may have a yellow color. In addition, when a pattern portion of red color is combined with a space portion, a corresponding pattern portion may have a red color as is and/or, when a pattern portion of green color is combined with a space portion, a corresponding pattern portion may have a green color as is. Thereby, each of the first lines 10 may be represented by yellow (Y), which is a mixed color of red (R) and green (G), and each of the first spaces 20 may be represented by black (b). However, the example embodiments are not limited thereto.

For example, if the first and second SEM images 100 and 110 have green (G) and blue (B), respectively, each of the first lines 10 may be represented by blue green, or if the first and second SEM images 100 and 110 have blue (B) and red (R), respectively, each of the first lines 10 may be represented by violet.

However, a portion of the third SEM image 120 in which the protrusion portion 15 of the second SEM image 110 and the first space 20 of the first SEM image 100 are aligned may be represented not by black (b) but by green (G). Additionally, a portion of the third SEM image 120 in which the cut portion 25 of the second SEM image 110 and the first line 10 of the first SEM image 100 are aligned may be represented not by yellow (Y) but by red (R).

Thus, portions of the third SEM image 120 not having the mixed colors of the respective colors of the first and second SEM images 100 and 110 (e.g., yellow (Y), which is a mixed color of red (R) and green (G), and/or black (b)), but having the colors of the first and second SEM images 100 and 110, (e.g., red (R) or green (G)) may be detected and may be selected as the locations of the defects of the pattern.

In FIG. 4, the protrusion portion 15 represented by green (G) and the cut portion 25 represented by red (R) may correspond to the locations of the defects of the pattern.

Referring to FIG. 1, in step S3, the defects of the pattern may be firstly classified at the locations of the defects of the pattern in the third SEM image 120.

For example, the protrusion portion 15 represented by green (G) may have the color of the second SEM image 110, which means that the protrusion portion 15 belongs not to the pattern of the reference chip but to the pattern of the target chip. Thus, the protrusion portion 15 may be classified as a newly generated portion in the pattern.

The cut portion 25 represented by red (R) may have the color of the first SEM image 110, which means that the cut portion 25 belongs not to the pattern of the target chip but to the pattern of the reference chip. Thus, the cut portion 25 may be classified as a lost portion from the pattern.

Referring to FIG. 1, in step S4, a design in which a layout of the pattern is drawn, and the SEM image may be aligned.

In example embodiments, the SEM image aligned with the design may be the merged SEM image (e.g., the third SEM image 120). However, the example embodiments are not limited thereto, and the SEM image aligned with the design may also be one of the first and second SEM images 100 and 110. Hereinafter, for clarity and brevity, only the case in which the design and the third SEM image 120 are aligned with each other.

FIG. 5 is a design in which the layout of the pattern is drawn, and FIG. 6 is a drawing in which FIGS. 4 and 5 are aligned with each other.

Referring to FIG. 5, second lines 50, each of which may extend in the first direction D1, spaced apart from each other in the second direction D2, and second spaces 60 between ones of the second lines 50 neighboring in the second direction D2 are shown in a design 130.

The second lines 50 and the second spaces 60 may correspond to the first lines 10 and the first spaces 20, respectively, shown in FIGS. 2 and 3. For example, a photolithography process may be performed using a mask that may be generated by the layout of the pattern drawn in the design 130 to realize the corresponding pattern in a wafer, and the first lines 10 and the first spaces 20, which may be originated from the second lines 50 and the second spaces 60, respectively, may be shown in the reference chip and the target chip including the real pattern.

Referring to FIG. 6 showing a drawing 140 that may be generated by aligning and merging FIGS. 4 and 5 with each other, the second lines 50 and the second spaces 60 may overlap the first lines 10 and the first spaces 20, respectively, however, some difference may occur due to errors generated during performing the photolithography process.

Referring to FIG. 1, in step S5, the layout of the pattern drawn in the design 130 and the SEM image may be compared with each other so that the defects of the pattern may be secondly classified.

Referring to FIG. 6, the cut portion 25 is formed at an inside of one of the second lines 50, and thus may be recognized as a defect generated in a shape of at least one of the lines 10 and/or 50.

Additionally, the protrusion portion 15 is formed at an inside of one of the second spaces 60, and thus may be recognized as a defect generated in a shape of at least one of the spaces 20 and/or 60.

Likewise, the defects of the pattern may be classified regarding the shape of the pattern in which the defects are generated.

Referring to FIG. 1, in step S6, the type of the defects of the pattern may be determined by combination of the first and second classifications of the defects of the pattern.

For example, the protrusion portion 15 may be determined as a newly generated portion in a pattern having a space shape, that is, a bridge. Additionally, the cut portion 25 may be determined as a lost portion in a pattern having line shape, that is, a pinch.

By the above steps, the type of the defects of the pattern may be finally classified.

Particularly, in step S1, the first and second SEM images 100 and 110 of the patterns in the reference chip and the target chip, respectively, which may have different colors from each other on the same pattern, may be aligned and merged with each other.

In step S2, in the merged SEM image, that is, in the third SEM image 120, portions represented by the colors of the first and second SEM images 100 and 110 except for black (b), (e.g., red (R) and/or green (G)) may be located as the defects of the pattern.

In step S3, at the locations of the defects, the defects may be firstly classified as to whether a portion of the pattern has been newly generated or lost by the colors of the third SEM image 120. For example, the portion of the third SEM image 120 represented by green (G), which may be the color of the second SEM image 110, may be classified as the newly generated portion, and the portion of the third SEM image 120 represented by red (R), which may be the color of the first SEM image 100, may be classified as the lost portion.

In step S4, the design 130 in which the layout of the pattern is drawn and the third SEM image 120 may be aligned with each other. The SEM image aligned with the design 130 may not be necessarily the third SEM image 120 and may be one of the first and second SEM images 100 and 110, if the first classification of the defects of the pattern is stored and used.

In step S5, the layout of the pattern drawn in the design 130 and the third SEM image 120 may be compared with each other to secondly classify the defects of the pattern regarding the shape of the portion in which the defects of the pattern are generated. For example, if the pattern includes a line and a space, the defects of the pattern may be classified as to whether the defects are generated in the line or in the space.

In step S6, the type of the defects of the pattern may be determined by combination of the first and second classifications of the defects of the pattern. For example, if a portion of the line is lost, it may be determined as a pinch, and if a portion of a space is newly generated, it may be determined as a bridge.

Thus, when the pattern has defects in the target chip when compared to the pattern in the reference chip, where the defects are generated and whether some portions of the pattern are generated or lost may be easily detected and determined by the colors of the merged SEM image, which may be formed by aligning and merging the SEM images having different colors from each other. Additionally, the design in which the layout of the pattern is drawn, and the merged SEM image may be aligned and compared with each other, and the shape of the pattern in which the defects are generated may be easily detected. By synthetically considering the locations of the defects, the generation or extinction of a specific portion of the pattern, and the shape of the pattern having the defects, the type of the defects of the pattern may be finally determined.

In the conventional method of classifying the defects of the pattern, the SEM images of the reference chip and the target chip have to be manually compared to each other. Additionally, even if the classification of the defects of the pattern is performed using machine learning, various types of pattern defects have to be learned in advance.

However, in the method of classifying the defects of the pattern in accordance with the example embodiments, the color difference in the merged SEM image may be detected to confirm the locations of the defects and the generation or extinction of a portion of the pattern, and the design and the merged SEM image may be compared with each other to confirm the shape of the pattern having the defects. Accordingly, when compared to the classification of the pattern defects through a manual process or the machine learning, the classification of the pattern defects may be easily, precisely, and automatically performed.

The classification of the pattern defects may be used to correct the pattern. For example, in some example embodiments, the classification of the pattern may be used to identify areas of the pattern wherein the critical dimensions of the pattern are too small and/or wherein features of the pattern are too close. For example, in some example embodiments, the classification may be used to identify a pattern distortion caused by, e.g., optical distortions such as those resulting in optical interference. In at least one example embodiment, neighboring tip-to-line may cause a bridge to form between neighboring lines 10 due to, e.g., pattern distortions in neighboring lines 10 and, in these cases, the pattern may be corrected by adjusting the location of the tips of the lines 10 accordingly. In at least one example embodiment, the pattern may be corrected based on the application optical proximity correction (OPC) and/or process proximity correction (PPC). In at least one example embodiment, the correction may further include identifying a target chip with a defect and disposing of the target chip when the defect is outside a preset (or otherwise determined) threshold.

Figure 7:
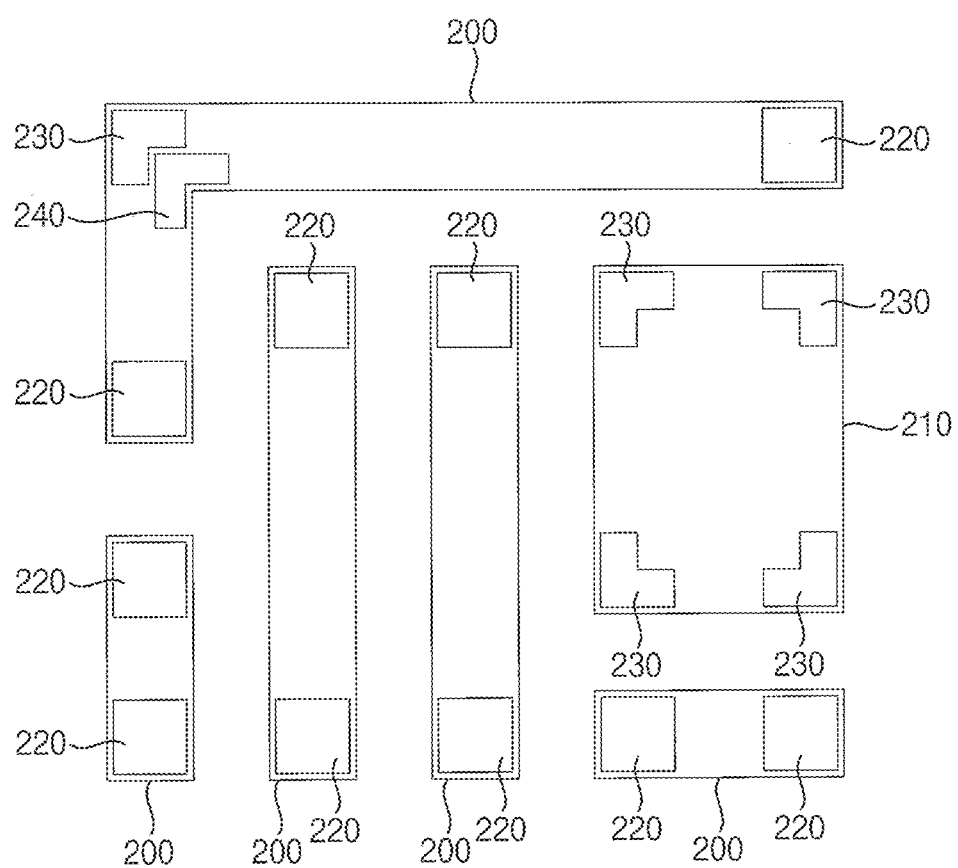
FIGS. 7 and 8 are plan views illustrating definitions of shapes of portions of a pattern.
Figure 8:
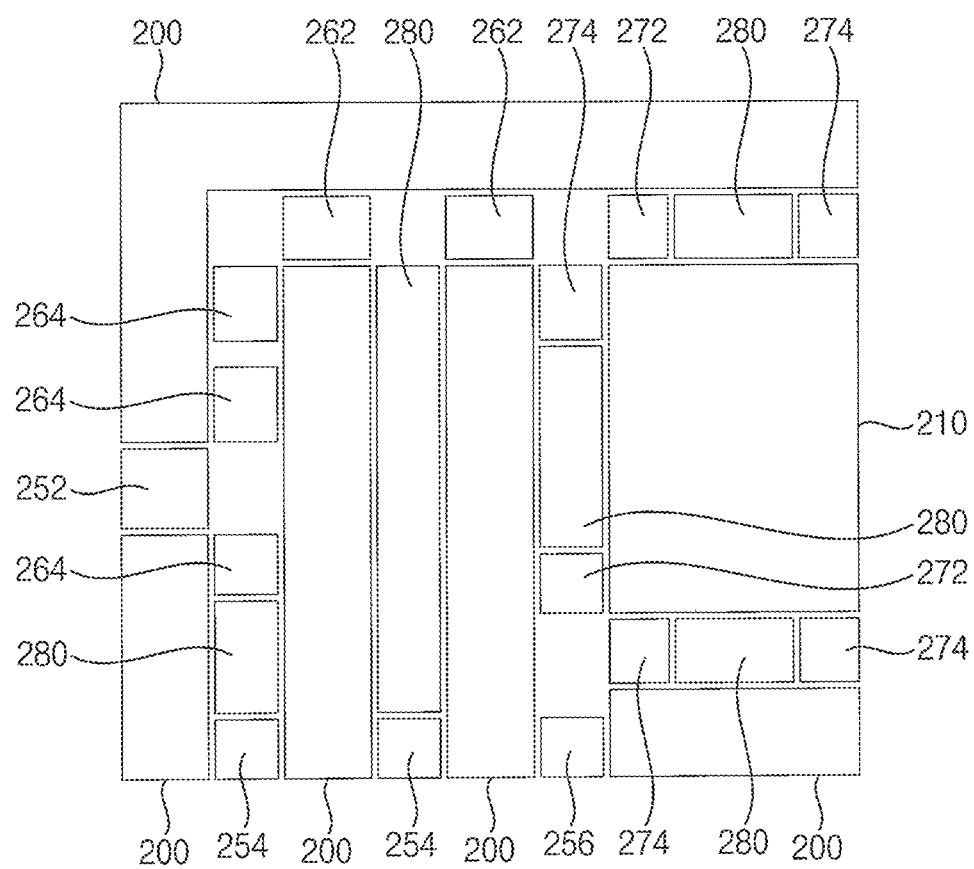

FIGS. 7 and 8 are plan views illustrating definitions of shapes of portions of a pattern.

Particularly, FIG. 7 is a plan view illustrating definitions of shapes of inner portions of a pattern, and FIG. 8 is a plan view illustrating definitions of shapes of outer portions of the pattern.

Referring to FIG. 7, the pattern may include a line 200 extending in one direction and/or extending in two directions, and a block 210 having a shape of a rectangle.

A tip 220 may be defined in the line 200, and a convex corner 230 and a concave corner 240 may be defined in the line 200 and the block 210.

Referring to FIG. 8, various shapes may be defined at an outside of the line 200 and/or the block 210 according to the positions thereof.

For example, a first tip-to-tip 252, a second tip-to-tip 254 and a third tip-to-tip 256 may be defined between an end of one of the lines 200 and an end of another one of the lines 200 adjacent thereto. For example, if two of the lines 200, each of which extends in a first direction, face each other in the first direction, the first tip-to-tip 252 may be defined between two respective ends in the first direction of the two of the lines 200 facing each other in the first direction. If two of the lines 200, each of which extends in the first direction, face each other in a second direction substantially perpendicular to the first direction, the second tip-to-tip 254 may be defined between two respective ends in the first direction of the two of the lines 200 facing each other in the second direction. The third tip-to-tip 256 may be defined between an end of one of the lines 200 extending in the first direction and an end of another one of the lines 200 extending in the second direction.

Additionally, a first tip-to-line 262 and a second tip-to-line 264 may be defined between an end of one of the lines 200 and another one of the lines 200 adjacent thereto. For example, the first tip-to-line 262 may be defined between an end of one of the lines 200 extending in the first direction and other portions, except for ends, of another one of the lines 200 extending in the second direction. The second tip-to-line 264 may be defined between an end of one of the lines 200 extending in the first direction and other portions, except for ends, of another one of the lines 200 extending in the first direction.

Additionally, a first corner-to-line 272 and a second corner-to-line 274 may be defined between a corner of the block 210 and one of the lines 200 adjacent thereto. For example, the first corner-to-line 272 may be defined between a corner of the block 210 and other portions, except for ends, of one of the lines 200 adjacent thereto, and the second corner-to-line 274 may be defined between a corner of the block 210 and an end of one of the lines 200 adjacent thereto.

Additionally, a space 280 may be defined between neighboring ones of the lines 200, each of which extends in the first direction, or between other portions, except for corners, of the block 210 and other portions, except for ends, of one of the lines 200 adjacent thereto, which extends in the first direction or in the second direction.

Likewise, portions having various shapes may be defined at an inside or an outside of the pattern in advance, which may be used in step S5 for classifying the shape of the portion in which the defects of the pattern are generated.

While the present inventive concepts have been shown and described with reference to example embodiments thereof, it will be understood by those of ordinary skill in the art that various changes in form and details may be made thereto without departing from the spirit and scope of the present inventive concepts as set forth by the following claims.

What is claimed is:

1. A method of classifying defects of chips, the method comprising:
   aligning and merging scanning electron microscope (SEM) images, having different colors, on a same pattern in the chips;
   locating the defects based on color difference in the merged SEM image, wherein the color difference is generated by pattern overlapping of the SEM images;
   firstly classifying the defects at the location of the defects;
   aligning a design in which a layout of the pattern is drawn and the merged SEM image;
   secondly classifying the defects based on the aligning of the design and the merged SEM image;
   determining a type of the defects based on a combination of the first and second classifications of the defects; and
   correcting the pattern based on the determination of the type of the defects.

2. The method according to claim 1, wherein the SEM images include a first SEM image and a second SEM image, and
   wherein the first SEM image is in black (b) and one of red (R), green (G) and blue (B), and the second SEM image is in black (b) and another of the RGB.

3. The method according to claim 2, wherein the first SEM image is in red (R) and black (b), and the second SEM image is in green (G) and black (b), and
   wherein the merged SEM image is in at least yellow (Y) and black (b).

4. The method according to claim 3, wherein locating the defects based on the color difference in the merged SEM image includes locating at least one portion of the merged SEM image represented by red (R) or green (G).

5. The method according to claim 4, wherein the first SEM image is a SEM image of the pattern in a reference chip, and the second SEM image is a SEM image of the pattern in a target chip, and
   wherein the firstly classifying the defects at the location of the defects includes
   classifying a portion of the merged SEM image represented by green (G) as a newly generated portion of the pattern, and
   classifying a portion of the merged SEM image represented by red (R) as a lost portion of the pattern.

6. The method according to claim 1, wherein the pattern includes:
   a plurality of lines, each of which extends in at least a first direction, spaced apart from each other in a second direction; and
   spaces between the lines.

7. The method according to claim 6, wherein the SEM images include a first SEM image and a second SEM image, and
wherein the lines are represented by a first color in the first SEM image and by a second color, different from the first color, in the second SEM images, respectively, and the spaces are represented by black (b).

8. The method according to claim 6, wherein the secondly classifying the defects by comparing the layout of the pattern drawn in the design and the merged SEM image includes:
classifying the defects as to whether the defects are generated in one of the lines or one of the spaces.

9. The method according to claim 8, wherein the determining the type of the defects based on the combination of the first and second classifications of the defects includes:
determining the defects as a pinch type if the defects are generated by losing a portion in one of the lines.

10. The method according to claim 8, wherein the determining the type of the defects based on the combination of the first and second classifications of the defects includes:
determining the defects as a bridge type if the defects are generated by generating a new portion in one of the spaces.

11. A method of classifying defects of chips, the method comprising:
aligning and merging scanning electron microscope (SEM) images having different colors on a same pattern in the chips;
locating the defects based on a color difference in the merged SEM image, wherein the color difference is generated by pattern overlapping of the SEM images;
classifying the defects at the location of the defects; and
correcting the pattern based on the classification of the defects.

12. The method according to claim 11, wherein the SEM images include a first SEM image and a second SEM image, and
wherein the first SEM image is a SEM image of the pattern in a reference chip, and the second SEM image is a SEM image of the pattern in a target chip.

13. The method according to claim 12, wherein the locating the defects based on the color difference in the merged SEM image includes locating the defects at a portion of the merged SEM image represented by a color that is not a mixed color of the different colors of the first and second SEM images.

14. The method according to claim 13, wherein the first SEM image is in black (b) and one of red (R), green (G) and blue (B), and the second SEM image is in black (b) and another of the RGB, and
wherein the classifying the defects at the location of the defects includes classifying a portion of the merged SEM image represented by one of the different colors.

15. The method according to claim 14, wherein the first SEM image is in red (R) and black (b), and the second SEM image is in green (G) and black (b), and
wherein the classifying the defects at the location of the defects includes
classifying a portion of the merged SEM image represented by green (G) as a newly generated portion of the pattern, and
classifying a portion of the merged SEM image represented by red (R) as a lost portion of the pattern.

16. The method according to claim 15, wherein the pattern includes:
a plurality of lines, each of which extends in at least a first direction, spaced apart from each other in a second direction; and
spaces between the lines, and
wherein the lines are represented by red (R) and green (G) in the first and second SEM images, respectively, and the spaces are represented by black (b).

17. The method according to claim 16, wherein the classifying the defects at the location of the defects includes a first classification of the defects and a second classification,
wherein the first classification includes classifying the defects at the location of the defects in the merged SEM image, and
wherein the second classification includes
aligning a design in which a layout of the pattern is drawn and the merged SEM image,
secondly classifying the defects based on the aligning of the design and the merged SEM image, and
determining a type of the defects by combination of the first and second classifications of the defects.

18. A method of classifying defects of chips, the method comprising:
aligning and merging scanning electron microscope (SEM) images having different colors on a same pattern in the chips;
locating the defects at a portion of the merged SEM image represented by a color that is one of the different colors of the first and second SEM images, wherein the color difference is generated by pattern overlapping of the SEM images;
firstly classifying the defects at the location of the defects by the represented color in the merged SEM image as to whether at least one of a newly generated portion is generated or a portion is lost in the pattern;
aligning a design in which a layout of the pattern is drawn and the merged SEM image;
secondly classifying the defects based on the aligning of the design and the merged SEM image;
determining a type of the defects of the pattern based on a combination of the first and second classifications of the defects; and
correcting the pattern based on the determination of the type of the defects.

19. The method according to claim 18, wherein the SEM images include a first SEM image and a second SEM image,
wherein the first SEM image is a SEM image of the pattern in a reference chip, and the second SEM image is a SEM image of the pattern in a target chip, and
wherein the firstly classifying the defects of the pattern at the location of the defects by the represented color in the merged SEM image includes
classifying a portion of the merged SEM image represented by a color of the second SEM image as the newly generated portion of the pattern, and
classifying a portion of the merged SEM image represented by a color of the first SEM image as the lost portion of the pattern.

20. The method according to claim 19, wherein the pattern includes:
a plurality of lines, each of which extends in at least a first direction, spaced apart from each other in a second direction; and
spaces between the lines, and wherein the secondly classifying the defects includes classifying the defects as to whether the defects are generated in one of the lines or one of the spaces.

\* \* \* \* \*